US010127576B2

(12) United States Patent
Mardikar

(10) Patent No.: US 10,127,576 B2
(45) Date of Patent: Nov. 13, 2018

(54) IDENTIFYING PURCHASE PATTERNS AND MARKETING BASED ON USER MOOD

(71) Applicant: PAYPAL, INC., San Jose, CA (US)

(72) Inventor: Upendra Mardikar, San Jose, CA (US)

(73) Assignee: INTUITIVE SURGICAL OPERATIONS, INC., Sunnyvale, CA (US)

( * ) Notice: Subject to any disclaimer, the term of this patent is extended or adjusted under 35 U.S.C. 154(b) by 606 days.

(21) Appl. No.: 14/685,557

(22) Filed: Apr. 13, 2015

(65) Prior Publication Data

US 2015/0220985 A1      Aug. 6, 2015

Related U.S. Application Data

(63) Continuation of application No. 12/972,311, filed on Dec. 17, 2010.

(51) Int. Cl.
G06Q 30/00 (2012.01)
G06Q 30/02 (2012.01)

(52) U.S. Cl.
CPC ..... *G06Q 30/0255* (2013.01); *G06Q 30/0269* (2013.01)

(58) Field of Classification Search
None
See application file for complete search history.

(56) References Cited

U.S. PATENT DOCUMENTS

| | | | |
|---|---|---|---|
| 9,619,834 B2* | 4/2017 | Tedjamulia | G06Q 30/0641 |
| 2002/0010639 A1* | 1/2002 | Howey | G06F 17/30876 |
| | | | 705/26.1 |
| 2002/0046104 A1* | 4/2002 | Kaddeche | G06Q 30/02 |
| | | | 705/14.56 |
| 2002/0143661 A1* | 10/2002 | Tumulty | G06Q 10/0637 |
| | | | 705/7.36 |
| 2002/0147628 A1* | 10/2002 | Specter | G06Q 30/02 |
| | | | 705/26.7 |
| 2003/0110503 A1* | 6/2003 | Perkes | H04N 7/17318 |
| | | | 725/86 |
| 2003/0163359 A1* | 8/2003 | Kanesaka | G06Q 30/02 |
| | | | 705/7.33 |
| 2005/0086605 A1* | 4/2005 | Ferrer | G06Q 30/02 |
| | | | 715/745 |
| 2005/0180549 A1* | 8/2005 | Chiu | H04M 3/4878 |
| | | | 379/88.16 |
| 2005/0288954 A1* | 12/2005 | McCarthy | A61B 5/6815 |
| | | | 705/2 |
| 2006/0015390 A1* | 1/2006 | Rijsinghani | G06F 17/3089 |
| | | | 705/7.29 |
| 2006/0170945 A1* | 8/2006 | Bill | G06F 17/30749 |
| | | | 358/1.13 |
| 2006/0173838 A1* | 8/2006 | Garg | G06Q 30/02 |

(Continued)

*Primary Examiner* — Matthew T Sittner
(74) *Attorney, Agent, or Firm* — Haynes and Boone, LLP

(57) ABSTRACT

A system and method for facilitating electronic commerce over a network, according to one or more embodiments, includes communicating with a user via a user device and a business entity via a business entity device over the network, monitoring user navigation events over the network, determining a mood of the user based on user navigation behavior, marketing to the user based on the mood of the user, and storing user information related to the user navigation events and the mood of the user.

20 Claims, 3 Drawing Sheets

(56) References Cited

U.S. PATENT DOCUMENTS

| | | | |
|---|---|---|---|
| 2006/0235753 A1* | 10/2006 | Kameyama | B60H 1/00742 705/15 |
| 2007/0113181 A1* | 5/2007 | Blattner | G06F 3/011 715/706 |
| 2007/0168216 A1* | 7/2007 | Lemelson | G06Q 30/00 705/26.1 |
| 2007/0238934 A1* | 10/2007 | Viswanathan | A61B 5/16 600/300 |
| 2007/0240230 A1* | 10/2007 | O'Connell | G06F 21/55 726/28 |
| 2007/0243509 A1* | 10/2007 | Stiebel | G06Q 30/02 434/236 |
| 2007/0250390 A1* | 10/2007 | Lee | G06Q 30/02 705/14.51 |
| 2008/0091510 A1* | 4/2008 | Crandall | G06Q 30/02 705/7.32 |
| 2008/0222295 A1* | 9/2008 | Robinson | G06F 17/30867 709/227 |
| 2008/0270398 A1* | 10/2008 | Landau | G06Q 30/02 |
| 2008/0306830 A1* | 12/2008 | Lasa | G06Q 30/02 705/14.16 |
| 2009/0099853 A1* | 4/2009 | Lemelson | G06Q 30/02 705/319 |
| 2009/0222838 A1* | 9/2009 | Ho | G06F 17/3087 719/314 |
| 2010/0145203 A1* | 6/2010 | Kim | A61B 5/024 600/509 |
| 2010/0168994 A1* | 7/2010 | Bourque | G01C 21/3617 701/532 |
| 2010/0325135 A1* | 12/2010 | Chen | G06F 17/30053 707/759 |
| 2011/0082731 A1* | 4/2011 | Kepecs | G06Q 30/02 705/14.17 |
| 2011/0106375 A1* | 5/2011 | Gurusamy Sundaram | H04W 4/00 701/31.4 |
| 2011/0148916 A1* | 6/2011 | Blattner | G06Q 10/107 345/619 |
| 2011/0161172 A1* | 6/2011 | Lee | G06O 30/02 705/14.55 |
| 2011/0173198 A1* | 7/2011 | Malleshaiah | G06F 17/30702 707/737 |
| 2011/0276406 A1* | 11/2011 | Sneyders | G06Q 30/02 705/14.66 |
| 2012/0047013 A1* | 2/2012 | Bigby | G06Q 30/02 705/14.52 |
| 2012/0047448 A1* | 2/2012 | Amidon | H04W 4/029 715/753 |
| 2012/0136941 A1* | 5/2012 | Howes | H04L 51/14 709/206 |
| 2012/0143685 A1* | 6/2012 | Miller | G06Q 30/0254 705/14.52 |
| 2012/0143693 A1* | 6/2012 | Chung | G06Q 30/0241 705/14.66 |
| 2012/0151383 A1* | 6/2012 | Kazan | G06Q 10/101 715/753 |
| 2012/0158503 A1* | 6/2012 | Mardikar | G06Q 30/0255 705/14.53 |
| 2012/0246684 A1* | 9/2012 | Yarvis | G06Q 30/02 725/60 |
| 2013/0117263 A1* | 5/2013 | Lukose | G06F 17/30884 707/736 |
| 2015/0220985 A1* | 8/2015 | Mardikar | G06Q 30/0255 705/14.53 |

\* cited by examiner

IDENTIFYING PURCHASE PATTERNS AND MARKETING BASED ON USER MOOD

CROSS REFERENCE TO RELATED APPLICATIONS

This application is a continuation of U.S. patent application Ser. No. 12/972,311, filed on Dec. 17, 2010, entitled "IDENTIFYING PURCHASE PATTERNS AND MARKETING BASED ON USER MOOD, the full disclosure of which is incorporated by reference herein in its entirety and for all purposes.

BACKGROUND

Technical Field

The present invention generally relates to facilitating electronic commerce over a network and, more particularly, to identifying current purchase patterns indicating mood over a network.

Related Art

In online financial transactions, users typically search for and purchase products and services through electronic communications with online merchants over electronic networks, such as the Internet. When shopping, users navigate through various merchant webpages to locate and select desirable items. However, searching for and locating desirable items can be cumbersome because merchants may have hundreds of items to navigate through. As a result, some merchants may offer a means to narrow search terms, but this can be time consuming and inconvenient because the user may understand the procedure.

As such, there exists a need to improve user experience for online searching and locating desirable items for purchase.

SUMMARY

Embodiments of the present disclosure provide systems and methods for facilitating electronic commerce including identifying purchase patterns over a network. The systems and methods include communicating with a user via a user device and a business entity via a business entity device over the network, monitoring user navigation events over the network, determining a mood of the user based on current user navigation behavior, marketing to the user based on the current mood of the user, and storing user information related to the user navigation events and the mood of the user.

In one implementation, the systems and methods may include prompting the user to login over the network after communicating with the user via the user device over the network, obtaining user information including user identity information from the user via the user device over the network, determining identity of the user based on the user information, and accessing a user account related to the user based on the identity of the user.

In another implementation, the systems and methods may include tracking user navigation events over the network, monitoring user selection events over the network, tracking user selection events over the network. The mood of the user may be based on user navigation behavior and user selection events.

In another implementation, the systems and methods may include monitoring user purchase events over the network and tracking user purchase events over the network. The mood of the user may be based on user navigation behavior and user purchase events.

In various implementations, the mood of the user may include a psychological state, emotional state, and a physical state of the user. Marketing to the user may include sending marketing messages (audio and/or video messages, advertisements, coupons, commercials, emails, voice mails, text messages, etc.) to the user via the user device over the network based on the mood of the user. The business entity may include a merchant entity, a social network entity, and/or an information resource entity, and the business entity may maintain and operate a network based website on the network including a merchant site, a social network site, and/or an information resource site.

Systems and methods, in accordance with embodiments of the present disclosure, are adapted to identify purchase patterns of a user over a network including identifying user selection patterns and user navigation patterns. In one aspect, identified navigation, selection, and/or purchase patterns may be utilized to identify the mood and/or persona identity of a user. For example, if a user's mood is philanthropic, the user may be in a mood to donate, and the user may not be in the mood to gamble. Therefore, marketing messages may be generated and/or adjusted to meet and/or anticipate the user's mood at a particular time during network navigation including online shopping. In another aspect, navigation models, marketing messages, identity systems, etc. related to the user may be enhanced to match the mood of the user in real time. As such, navigational behavior and purchase history of the user may be utilized to model the mood and personality traits of the user to provide a seamless experience during online navigation.

These and other aspects of the present disclosure will be more readily apparent from the detailed description of the embodiments set forth below taken in conjunction with the accompanying drawings.

Embodiments of the invention and their advantages are best understood by referring to the detailed description that follows.

DETAILED DESCRIPTION

Embodiments of the present disclosure provide systems and methods for facilitating electronic commerce over a network including identifying user navigation patterns including user purchase patterns. For instance, service providers may have users purchasing different items, products, and services from different network based websites. Merchants, developers, and social networking entities may be classified into different categories. User purchase patterns that are known by the service providers may be utilized to identify a current mood of users, because user purchasing may depend on the mood of the user at specific times. Navigation models, marketing messages, identity systems, etc. may be adapted to match the current mood of the user in real time. Purchase history and navigational behavior may be utilized to model mood and identity of users for seamless experiences during online navigation. Thus, based on current mood of a user, specific offers or information may be provided to the user to enable a richer user experience and/or stimulate spending. These and other aspects of the present disclosure are described in greater detail herein.

Figure 1:
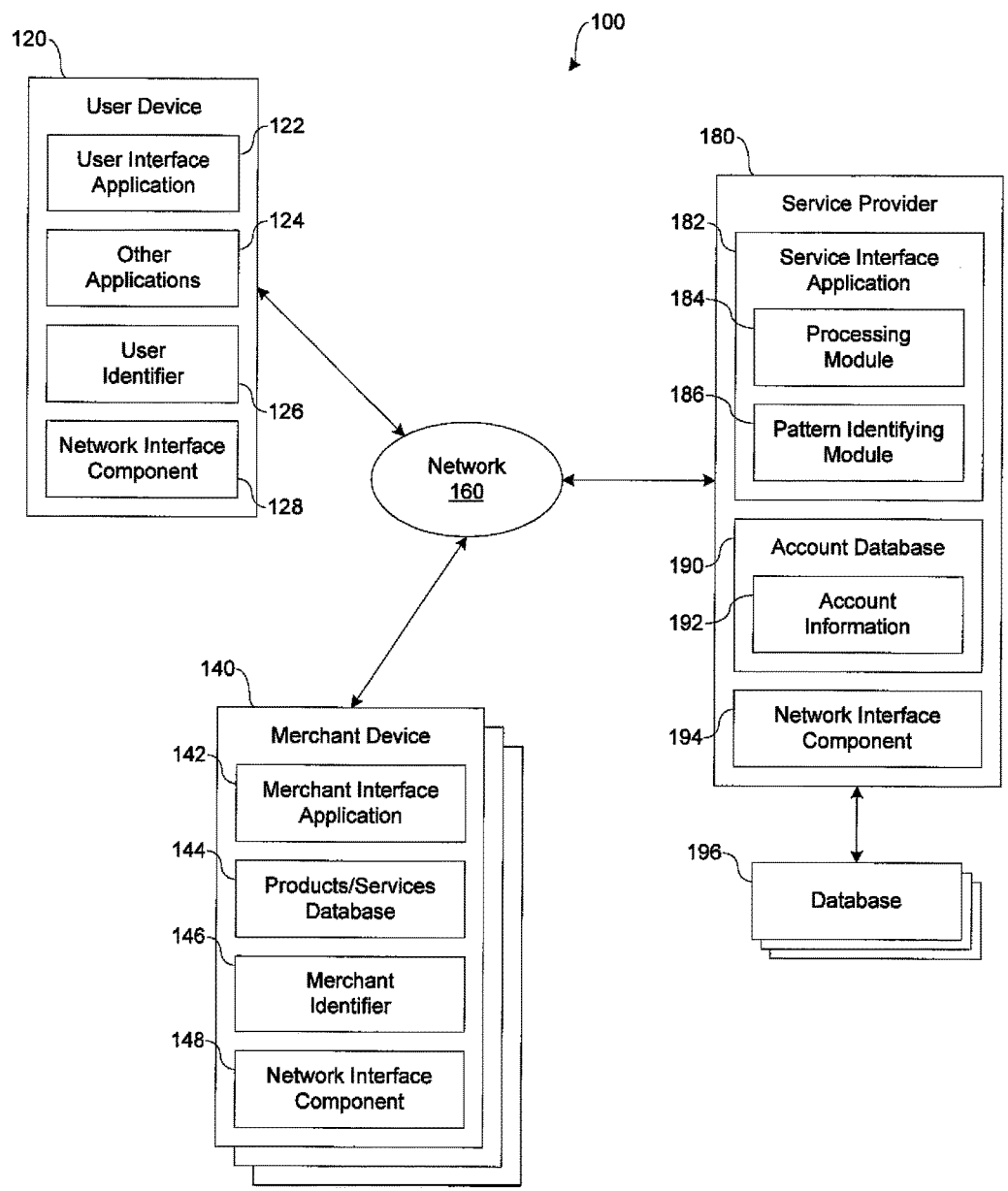
FIG. 1 shows a block diagram of a system adapted to facilitate electronic commerce over a network, in accordance with embodiments of the present disclosure.

FIG. 1 shows one embodiment of a system 100 adapted for facilitating electronic commerce over a network 160, such as the Internet and/or a mobile communication network. As shown in FIG. 1, the system 100 includes a user device 120 (e.g., a client, customer, or consumer device) adapted to interface with one or more merchant devices 140 (e.g., one or more business entities proffering items, products, and/or services for purchase), and a service provider 160 (e.g., a network based transaction service provider, such as a payment processing and/or settlement transaction provider) over the network 160. In various aspects, the merchant devices 140 may comprise information resource devices, social networking devices, etc., without departing from the scope of the present disclosure.

The network 160, in one embodiment, may be implemented as a single network or a combination of multiple networks. For example, the network 160 may include a wireless telecommunications network (e.g., cellular telephone network) adapted for communication with one or more other communication networks, such as the Internet. In other examples, the network 160 may include the Internet, one or more intranets, landline networks, wireless networks, and/or one or more other appropriate types of communication networks. As such, in various implementations, the user device 120, the one or more merchant devices 140, and the service provider 180 may be associated with a particular link (e.g., a link, such as a URL (Uniform Resource Locator) to an IP (Internet Protocol) address).

The user device 120, in various embodiments, may be implemented using any appropriate combination of hardware and/or software configured for wired and/or wireless communication over the network 160. In one embodiment, the user device 120 may be implemented as a mobile communication device (e.g., wireless cellular phone) adapted for communication with the network 160. In other embodiments, the user device 120 may be implemented as a personal computer (PC), a personal digital assistant (PDA), a notebook computer, and/or various other generally known types of wired and/or wireless computing devices for communication with the network 160. It should be appreciated that the user device 120 may be referred to as a client device or a customer device without departing from the scope of the present disclosure.

The user device 120, in one embodiment, includes a user interface application 122, which may be utilized by a user to conduct network based financial transactions (e.g., remote network based electronic commerce) with the one or more merchant devices 140 and/or the service provider 180 over the network 160. In various implementations, the user interface application 122 may be implemented as a network commerce application and/or a mobile commerce application to initiate, track, manage, and store data and information (e.g., user identity data and information) related to network based electronic commerce for viewing, searching, and/or purchasing items, products, and/or services over the network 160. In one aspect, the user device 120 may be linked to an account with the service provider 160 for direct and/or automatic settlement of purchase requests between a user and the one or more merchant devices 140 via the user interface application 122.

In one embodiment, the user interface application 122 comprises a software program, such as a graphical user interface (GUI), executable by a processor that is configured to interface and communicate with the one or more merchant devices 140 and/or the service provider 180 via the network 160. In one implementation, the user interface application 122 comprises a browser module adapted to provide a network interface to browse information (e.g., user identity information) available over the network 160. For example, the user interface application 122 may be implemented, in part, as a web browser to view and search various types of information available over the network 160. In another example, the user is able to access merchant websites of the one or more merchant devices 140 over the network 160 to view, search, and select items, products, and/or services for purchase, and the user is able to purchase selected items, products, and/or services from the one or more merchant devices 140 via the service provider 180. The user may conduct network based financial transactions with one or more merchant devices 140 via the service provider 180.

In one embodiment, upon user instruction, the user interface application 122 may be installed and/or run on the user device 120. The user may run the user interface application 122 on the user device 120 to access the service provider 180 via the network 160. In one aspect, upon installation and/or execution of the user interface application 122, the user may be prompted to establish a user account for login with the service provider 180, wherein the user may use the user interface application 122 and the user device 120 to access the service provider 180 via the network 160. When establishing a user account, the user may be asked to provide personal information, such as name, location information (e.g., address), phone number, etc., and financial information, such as banking information, credit card information, etc. In another aspect, referring to FIG. 1, information related to the user may be packaged as a user identifier 126, which is described in greater detail herein.

The user device 120, in various embodiments, may include other applications 124 as may be desired in one or more embodiments of the present disclosure to provide additional features available to the user. In various examples, such other applications 124 may include security applications for implementing user-side security features, programmatic client applications for interfacing with appropriate application programming interfaces (APIs) over the network 160, and/or various other types of generally known programs and/or software applications. In various other examples, other applications 124 may interface with the user interface application 122 for improved efficiency and convenience. In one example, files, data, and/or information may be imported from various types of accounting software (e.g., a spreadsheet application) directly into the user interface application 122 for improved tracking of payments and settlements related to purchases via the network 160. Accordingly, it should be appreciated that the user interface application 122 and each of the other applications 124 are adapted to make API calls over the network 160.

The user device 120, in various embodiments, may include the user identifier 126, which may be implemented as operating system registry entries, cookies associated with the user interface application 122, identifiers associated with hardware of the user device 120, and/or various other appropriate identifiers. The user identifier 126 may include one or more attributes related to the user, such as personal information related to the user (e.g., one or more user names, passwords, photograph images, biometric ids, addresses, phone numbers, etc.) and banking information (e.g., one or more banking institutions, credit card issuers, user account numbers, security data and information, etc.). In various aspects, the user identifier 126 may be passed with user transaction requests to the service provider 180 via the network 160, and the user identifier 126 may be utilized by the service provider 180 to associate the user with a particular user account maintained by the service provider 180.

The user device 120, in one embodiment, may include a network interface component (NIC) 128 adapted for communication with the network 160. In various implementations, the network interface component 128 may comprise a wireless communication component, such as a mobile cellular component, a wireless broadband component, a wireless satellite component, or various other types of wireless communication components including radio frequency (RF), microwave frequency (MWF), and/or infrared frequency (IRF) components adapted for communication with the network 160. In various other implementations, the network interface component 128 may be adapted to interface with a DSL (e.g., Digital Subscriber Line) modem, a PSTN (Public Switched Telephone Network) modem, an Ethernet device, and/or various other types of wired and/or wireless network communication devices adapted for communication with the network 160.

The one or more merchant devices 140, in one embodiment, may be implemented using any appropriate combination of hardware and/or software configured for wired and/or wireless communication over the network 160. In various implementations, the merchant devices 140 may be implemented as a network server, a personal computer (PC), a personal digital assistant (PDA), a notebook computer, and/or various other generally known types of wired and/or wireless computing devices for communication with the network 160. In another implementation, the merchant device 140 may be implemented as a mobile device (e.g., a wireless cellular phone) adapted for communication with the network 160.

In another embodiment, the one or more merchant devices 140 may be maintained as one or more network servers by one or more business entities (e.g., merchant sites, resource information sites, utility sites, real estate management sites, social networking sites, etc.) offering various items, products, and/or services for purchase and payment, which may need registration of user identity information as part of offering the items, products, and/or services to one or more users over the network 160. Accordingly, each of the one or more merchant devices 140 may comprise at least one network based server in communication with the network 160 having a merchant interface application 142 and a products/services database 144 for presenting and identifying one or more available items, products, and/or services for purchase via the network 160, which may be made available to the user device 120 for viewing and purchase by the user. In one aspect, each of the network based merchant servers may be accessible via a mobile communication device (e.g., wireless cellular phone) for management purposes. For example, each merchant entity may remotely access and interact with their own network based merchant server via a mobile communication device for management purposes.

In one embodiment, each of the merchant devices 140 includes the merchant interface application 142, which may be utilized by the one or more merchant devices 140 to conduct network based financial transactions (e.g., remote network commerce, such as shopping, purchasing, bidding, etc.) with one or more users via one or more user devices 120 and/or the service provider 180 over the network 160. For example, the merchant interface application 142 may be implemented as an electronic commerce application to initiate, track, manage, and store data and information (e.g., user identity data and information) related to remote network based commerce for the viewing, searching, and purchasing of items, products, and/or services over the network 160. In one aspect, each merchant device 140 may be linked to an account with the service provider 160 for direct and/or automatic settlement of purchase requests between each merchant 140 and one or more users via the merchant interface application 142.

In one implementation, the merchant interface application 142 comprises a software program, such as a GUI, executable by a processor configured to interface and communicate with one or more users via one or more user devices 120 and/or the service provider 180 via the network 160. In another implementation, merchant interface application 142 comprises a network interface module that makes information available to the user device 120 over the network 160. For example, the merchant interface application 142 may be implemented, in part, as a website manager to provide, list, and present information to the user device 120 via the network 160. In another example, each merchant 140 is capable of providing one or more network based merchant websites to allow viewing, searching, and selecting of items, products, and/or services for purchase by the user via the user device 120, and the user is able to purchase items, products, and/or services from the one or more merchant devices 140 via the merchant websites and the service provider 180. As such, each of the merchant devices 140 may conduct financial transactions with the user via the merchant interface application 142 and the service provider 180.

In various implementations, the merchant interface application 142 may include a marketplace application, which may be configured to provide transaction information related to the products and/or services database 144 to the user interface application 122 of the user device 120 via the network 160. In one aspect, the transaction information may include user identity information. For example, the user may interact with the merchant 140 via the marketplace application through the user interface application 122 over the network 160 to search and view various items, products, and/or services available for purchase from the products/services database 144. In one implementation, the marketplace application may include a checkout module adapted to facilitate online financial transactions with the user 120, and the checkout module may be adapted to accept payment from the user 120 and process the payment via interaction with the service provider 180.

In one implementation, upon merchant instruction, the merchant interface application 142 may be installed and/or run on each merchant device 140. Each merchant may run the merchant interface application 142 on their merchant device 140 to access service provider 180 via the network 160. In one aspect, upon installation and/or execution of the merchant interface application 142, each merchant may be prompted to establish a merchant account for login with the service provider 180, wherein each merchant may use merchant interface application 142 and merchant device 140 to access the service provider 180 via the network 160. In one aspect, when establishing a merchant account, each merchant may be asked to provide business information, such as business name, location information (e.g., address), phone number, etc., and financial information, such as banking information, credit card information, taxing entity, etc. In another aspect, information related to the merchant may be packaged as a merchant identifier 146, which is described in greater detail herein.

In various implementations, the merchant interface application 142 may include one or more other applications as may be desired to provide additional features available to the merchant. In various examples, such other applications may include security applications for implementing user-side security features, programmatic applications for interfacing with appropriate application programming interfaces (APIs) over the network 160, and/or various other types of generally known programs and/or software applications. In various other examples, files, data, and/or information may be imported from various types of accounting software (e.g., a spreadsheet application) directly into the merchant interface application 142 for improved tracking of payments and settlements related to electronic commerce via the network 160. As such, it should be appreciated that merchant interface application 142 and any other application may be adapted to make API calls over the network 160.

Each of the merchant devices 140, in various embodiments, may include at least one merchant identifier 146, which may be included as part of the one or more items, products, and/or services made available for purchase so that, e.g., particular items, products, and/or services are associated with particular merchant devices 140. In one implementation, the merchant identifier 146 may include one or more attributes and/or parameters related to the merchant, such as business and/or banking information. For example, the merchant identifier 146 may be passed from each particular merchant 140 to the service provider 180 when the user selects an item, product, and/or service for holding, monitoring, and/or purchasing from each particular merchant 140. In one aspect, the merchant identifier 146 may be used by the service provider 180 to associate particular items, products, and/or services selected for purchase with a particular merchant account maintained by the service provider 180. In another aspect, the user may conduct financial transactions (e.g., selection, monitoring, purchasing, and/or providing payment for items, products, and/or services) with each merchant server 140 via the service provider 180 over the network 160.

In various embodiments, each of the one or more business entities having a related merchant server 140 may need to establish at least one merchant account with the service provider 180. When establishing a merchant account, each of the one or more business entities may need to provide business information, such as owner name, owner address, social security number, date of birth, phone number, email address, etc., and financial information, such as banking information, merchant account information, credit card information, payment processing information, etc.

In one embodiment, each merchant device 140 includes at least one network interface component (NIC) 148 adapted for communication with the network 160. For example, in various implementations, the network interface component 148 may comprise a wireless communication component, such as a mobile cellular component, a wireless broadband component, a wireless satellite component, or various other types of wireless communication components including radio frequency (RF), microwave frequency (MWF), and/or infrared frequency (IRF) components adapted for communication with the network 160. In various other implementations, the network interface component 148 may be adapted to interface with a DSL (e.g., Digital Subscriber Line) modem, a PSTN (Public Switched Telephone Network) modem, an Ethernet device, and/or various other types of wired and/or wireless network communication devices adapted for communication with the network 160.

The service provider 180, in one embodiment, may be maintained and operated by a network based transaction processing entity, which may provide processing for network based transactions including online information and/or financial transactions on behalf of the user via the user device 120 and/or each merchant device 140. As shown in FIG. 1, the service provider 180 includes a service interface application 182, which may be adapted to interact with the user device 120 and/or each merchant 140 over the network 160 to facilitate electronic commerce including processing user identity data and information. In various examples, financial transactions may include the selection, purchase, and/or payment of items, products, and/or services by a user via the user device 120 from one or more merchant devices 140. In some examples, purchase and payment for selected items, products, and/or services may include one or more tax assessments. In one embodiment, the service provider 180 may be provided by a network based transaction processing entity, such as PayPal, Inc. and/or eBay of San Jose, Calif., USA.

The service interface application 182, in one embodiment, is adapted to utilize a processing module 184 to interact with the user via the user interface application 122 over the network 160 and process information transactions including purchases and/or payments for financial transactions between the user device 120 and each of the merchant devices 140. In one implementation, the processing module 184 is adapted to resolve financial transactions through validation, delivery, and settlement. For example, the processing module 184 may be adapted to communicate with a clearing house, such as automated clearing house (ACH), to debit a user account related to the user according to an amount specific in a payment and credit therewith a merchant account related to a merchant. In another implementation, the processing module 184 is adapted to assess and disperse taxes for financial transactions through validation, delivery, and settlement. For example, tax assessment may include automatically calculating tax on Internet purchases based on buyer location, seller location, and/or type of items, products, and/or services purchased. Accordingly, the service interface application 182 in conjunction with the processing module 184 is adapted to settle indebtedness on behalf of a user between the user device 120 and each of the merchant devices 140, wherein accounts may be directly and/or automatically debited and/or credited, respectively, of monetary funds in a manner as accepted by the banking industry.

The service interface application 182, in one embodiment, is adapted to utilize a pattern identifying module 186 to interact with the user via the user interface application 122 over the network 160 and identify selection, navigation, and/or purchase patterns of the user for network based transactions. In one implementation, the pattern identifying module 186 is adapted to utilize user selection, navigation, and/or purchase patterns to identify the mood and identity of the user during information transactions over the network 160, such as when navigating and/or purchasing items (i.e., goods, products, and/or services) over the network 160, such as the Internet. In one aspect, the pattern identifying module 186 is adapted to identify a user's mood and/or identity via the user device 120 over the network 160.\

In one implementation, the pattern identifying module 186 is adapted to monitor, track, log, and store data and information related to user selection, navigation, and/or purchasing events during online navigation by the user via the user device 120. In one aspect, the pattern identifying module 186 allows the service provider 180 to monitor, track, log, and store user selection events during online navigation over the network 160. For example, the service provider 180 interfaces with the user device 120 via, e.g., a browser window to monitor, track, log, and store navigation events related to the user and the user device 120 during online navigation on various merchant sites, social network sites, information resource sites, etc. The pattern identifying module 186 may be utilized by the service provider 180 to monitor, track, log, and store user selections of merchant information, social network information, resource information, etc. In another example, the pattern identifying module 186 may be utilized by the service provider 180 to identify user selection patterns for determining the mood of the user and/or verifying the identity of the user. In another example, the service provider 180 may utilize the pattern identifying module 186 to review user navigational history and user navigational behavior for modeling the mood of a user, including a psychological state, an emotional state and/or a physical state of the user.

In one implementation, the pattern identifying module 186 is adapted to notify users of data and information (e.g., marketing messages) based on the mood of the user. For example, the pattern identifying module 186 is adapted to notify or alert the user of merchant sites related to the mood of the user with notifications or alerts (e.g., email message, text message, instant message, voice message, etc.) provided over the network 160.

In one implementation, the pattern identifying module 186 is adapted to process user selection events during online shopping by the user via the user device 120. In one aspect, the pattern identifying module 186 allows the service provider 180 to process user selections during online navigation and shopping events over the network 160. For example, the service provider 180 interfaces with the user device 120 via, e.g., a browser window to monitor the user and the user device 120 during navigation and shopping events on various merchant sites, social network sites, information resource sites, etc. The pattern identifying module 186 may be utilized by the service provider 180 to monitor user selections of one or more items, products, and/or services. In another example, the pattern identifying module 186 may be used by the service provider 180 to provide the user with estimated tax amounts for items, products, and/or services held in an online shopping cart.

In one aspect, the service provider 180 is adapted to monitor, track, log, and store data and information related to user selection, navigation, and purchase events from multiple online sites over the network 160. As such, user selection, navigation, and purchase patterns known by the service provider 180 may be utilized to identify the mood of the user, including the mental and emotional state of the user, and orient marketing information to the mood of the user at a specific time. For example, if a user's mood is philanthropic, the user may be inclined to donate, and at the same time, the user may not be inclined to gamble. Therefore, the service provider 180 is adapted to enhance user navigation models, marketing messages, identity systems, etc. to match the mood of the user in real time. In one aspect, user behavior including selection, navigation, and purchase history may be utilized by the service provider 180 to model mood and/or the identity of a user. For example, if a user is prone to purchase electronic items, the user is provided with a seamless experience during online navigation.

The service provider 180, in one embodiment, may be configured to maintain one or more user accounts and merchant accounts in an account database 190, each of which may include account information 192 associated with one or more individual users and the one or more merchant devices 140. In various examples, account information 192 may include user identity data and information related to one or more users and/or merchants. In various other examples, account information 192 may include inventory information, such as types of items, products, and/or services proffered for sale by the user and/or merchants. As such, it should be appreciated that the user may be considered a buyer or seller and proffer items, products, and/or services for sale over the network 160, without departing from the scope of the present disclosure. It should also be appreciated that the merchant may be considered a buyer or seller and proffer items, products, and/or services for sale over the network 160, without departing from the scope of the present disclosure.

In another example, account information 192 may include private financial data and information of the user and/or each merchant 140, such as one or more locations, addresses, account numbers, passwords, credit card information, banking information, or other types of financial information, which may be used to facilitate online financial transactions between the user and the one or more merchant devices 140. In various implementations, the methods and systems described herein may be modified to accommodate additional users and/or additional merchants that may or may not be associated with at least one existing user account and/or merchant account, respectively.

In one implementation, the user and/or user device 120 may have identity attributes stored with the service provider 180 as the user identifier 126, and the user and/or user device 120 may have credentials to authenticate or verify identity with the service provider 180. In one aspect, user attributes may include personal information and banking information, as previously described, including location, tax rates, etc. In other aspects, the user attributes may be passed to the service provider 180 as part of a login and/or transaction request, and the user attributes may be utilized by the service provider 180 to associate the user and/or the user device 120 with one or more particular user accounts in the account database 190 maintained by the service provider 180.

In another implementation, each of the merchants and/or merchant devices 140 may have identity attributes stored with the service provider 180 as merchant identifiers 146, and each of the merchant devices 140 may have credentials to authenticate or verify identity with the service provider 180. In one aspect, merchant attributes may include personal, business, and banking information, as previously described, including location, tax rates, etc. In other aspects, the merchant attributes may be passed to the service provider 180 as part of a login and/or transaction request, and the merchant attributes may be utilized by the service provider 180 to associate each of the merchant devices 140 with one or more merchant accounts in the account database 190 maintained by the service provider 180.

The service provider 180, in various embodiments, may include a network interface component (NIC) 194 adapted for communication with the network 160 and any network based communication devices including the network interface component 128 of the user device 120 and the network interface component 148 of each merchant 140. In various implementations, the network interface component 194 of the service provider 180 may include a wireless communication component, such as a wireless broadband component, a wireless satellite component, or various other types of wireless communication components including radio frequency (RF), microwave frequency (MWF), and/or infrared frequency (IRF) components adapted for communication with the network 160. In other various implementations, the network interface component 148 may be adapted to interface with a DSL (e.g., Digital Subscriber Line) modem, a PSTN (Public Switched Telephone Network) modem, an Ethernet device, and/or various other types of wired and/or wireless network communication devices adapted for communication with the network 160.

The service provider 180, in one embodiment, may include one or more databases 196 (e.g., internal and/or external databases) for storing and tracking information related to financial transactions, including user identity data and information, between one or more users, merchant devices 140, and service provider 180. In one implementation, the databases 196 may provide a historical survey of financial transactions between the user device 120, the one or more merchant devices 140, and the service provider 180. For example, the service interface application 182 may be adapted to monitor, track, log, and store transaction information, including user identity data and information, related to network based electronic commerce between the user device 120, each merchant 140, and/or the service provider 180, and the stored transaction information is accessible from the databases 196 for assessment, analysis, maintenance, and settlement.

Figure 2:
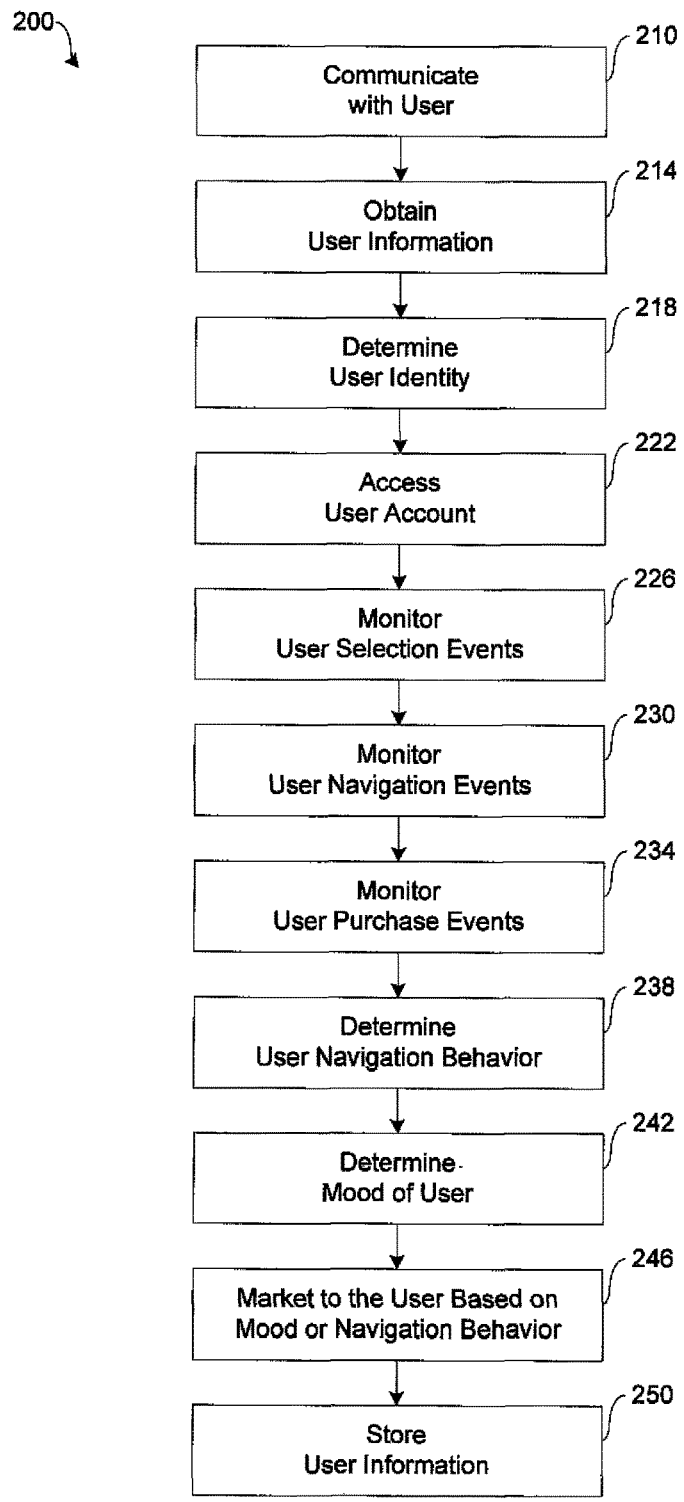
FIG. 2 shows a block diagram of a method adapted to facilitate electronic commerce over a network, in accordance with embodiments of the present disclosure.

FIG. 2 shows one embodiment of a method 200 for facilitating electronic commerce including identifying purchase patterns over a network 160. It should be appreciated that, for purposes of explanation, the method 200 of FIG. 2 is described in reference to the system 100 of FIG. 1, but should not be limited thereto.

Referring to FIG. 2, the service provider 180 is adapted to communicate with a user via the user device 120 over the network 160 (block 210). In one implementation, the service provider 180 utilizes the service interface application 182 to communicate with the user over the network 160 via the user interface application 122 of the user device 120. The processing module 184 may be utilized by the service interface application 182 to process transactions (e.g., information and financial transactions) over the network 160. The pattern indentifying module 186 may be utilized by the service interface application 182 to monitor, track, log, and store data and information related to user selection, navigation, and purchase events over the network 160.

The service provider 180 is adapted to obtain user information, such as identity data and information, from communication with the user via the user device 120 over the network 160 (block 214). In one implementation, the service provider 180 may prompt the user to login from the user device 120 over the network 160. As such, the user may login to a server of the service provider 180 to provide user related information.

The service provider 180 is adapted to determine user identity based on information obtained from communication with the user via the user device 120 over the network 160 (block 218). In one aspect, user identity information may include attributes related to the user, such as personal information related to the user (e.g., usernames, passwords, account numbers, payment media information, photograph images, biometric ids, addresses including location information, phone numbers, etc.) and banking information (e.g., banking institutions, debit card issuers, credit card issuers, user account numbers, payment media information, security information, etc.). In one aspect, the user identity information may be utilized by the service provider 180 to verify the identity of the user along with verifying payment media, such as debit cards and/or credit cards.

The service provider 180 is adapted to access a user account related to the user in the account database 190 based on user information passed from the user device 120 over the network 160 (block 222). In one implementation, the service provider device 180 is adapted to locate and access an account related to the user in the account database 190. If the user is determined to be an existing user by the service provider 180, then the service provider 180 is adapted to verify the user account and user identity information obtained from the user 102 by comparing the obtained user information with account information 192 stored as part of the user account in the account database 190. The service provider 180 may determine if the user account is current and active. In some instances, user account information may need to be updated, and as such, the service provider device 180 may prompt the user 102 to update user account information 188, including payment media information (e.g., debit card and/or credit card numbers, expiration dates, etc.), in the user account. The updated information may include other payment media information, including a change of address.

It should be appreciated by those skilled in the art that the service provider 180 may cancel any user request at any time during the process of method 200 if, for example, it is determined by the service provider 180 that the user enters wrong information or the user is trying to access an account with criminal intent.

In one implementation, referring to FIG. 2, the service provider 180 is adapted to monitor user selection events over the network 160 (block 226). As described herein, the service application 182 is adapted to utilize the pattern identifying module 186 to monitor, track, log, and store data and information related to user selection events during online navigation by the user via the user device 120 over the network 160. In one aspect, the service provider 180 interfaces with the user device 120 via the user interface application 122 (e.g., a browser application) to monitor, track, log, and store user selection events during online navigation over the network 160. For example, a user may visit an online resource, social, and/or merchant website and select pages to view data and information related to the particular site. In another aspect, the pattern identifying module 186 may be utilized by the service provider 180 to identify a mood of the user based on user selections events. For example, the user may visit a social networking website to search for a companion. Around the same time, the user may access a healthy living website. Therefore, an assumption about the user may be made that the user is in a self-improving mood. In one aspect, mood of the user refers to a psychological state, emotional state, and/or physical state of the user.

In one implementation, referring to FIG. 2, the service provider 180 is adapted to monitor user navigation events over the network 160 (block 230). As described herein, the service application 182 is adapted to utilize the pattern identifying module 186 to monitor, track, log, and store data and information related to user navigation events during online navigation by the user via the user device 120 over the network 160. In one aspect, the service provider 180 interfaces with the user device 120 via the user interface application 122 (e.g., a browser application) to monitor, track, log, and store user navigation events during online navigation over the network 160. For example, a user may visit an online resource, social, and/or merchant website and navigate through pages to view data and information related to the particular site. In another aspect, the pattern identifying module 186 may be utilized by the service provider 180 to identify a mood of the user based on user navigation events. For example, the user may visit a philanthropic website to make donations to a charity. Around the same time, the user may not access a gambling website. Therefore, an assumption about the user may be made that the user is in a philanthropic mood.

In one implementation, referring to FIG. 2, the service provider 180 is adapted to monitor user purchase events over the network 160 (block 234). As described herein, the service application 182 is adapted to utilize the pattern identifying module 186 to monitor, track, log, and store data and information related to user purchase events during online navigation by the user via the user device 120 over the network 160. In one aspect, the service provider 180 interfaces with the user device 120 via the user interface application 122 (e.g., a browser application) to monitor, track, log, and store user purchase events during online navigation over the network 160. For example, a user may visit an online resource, social, and/or merchant website and navigate through pages to view data and information related to purchasing websites. In another aspect, the pattern identifying module 186 may be utilized by the service provider 180 to identify a purchasing mood of the user based on user purchase events. For example, the user may visit personal electronics website and purchase mobile communication device. Around the same time, the user may access a video gaming website. Therefore, an assumption about the user may be made that the user is currently in a mobile gaming mood.

In one aspect, a user may visit an online merchant website and navigate through the product pages to select one or more items for purchase. The selected items are placed in a virtual shopping cart until checkout. When the user is done shopping, the user accesses a merchant webpage for viewing the selected items in the virtual shopping cart. At this merchant page, the user may decide to checkout (i.e., purchase) and select a link to the service provider 180 to request processing of the purchase transaction. Upon user selection, the service provider 180 receives a purchase request in reference to the shopping cart and the one or more items selected for purchase. In one implementation, the user purchase request includes information related to the transaction including user information (e.g., user name, user account, user location, payment media information, etc.) and merchant information (e.g., merchant name, merchant account, merchant location, and one or more items selected for purchase including item description, category, price, weight, size, etc.).

Referring to FIG. 2, in one implementation, the service provider 180 is adapted to determine user navigation behavior based on user selection, navigation, and/or purchasing events over the network 160 (block 238). In one aspect, the service provider 180 monitors the navigation behavior of the user as the user visits, searches, and purchases different things from different websites over the network 160. Each of the merchants, developers, and/or service entities may be arranged into different categories, wherein user selection, navigation, and/or purchase patterns known to the service provider 180 may be utilized to determine the user's navigation behavior at different periods of time.

Referring to FIG. 2, in one implementation, the service provider 180 is adapted to determine user mood based on user selection, navigation, and/or purchasing events over the network 160 (block 242). In one aspect, the service provider 180 monitors the navigation behavior of the user as the user visits, searches, and purchases different things from different websites over the network 160. Each of the merchants, developers, and/or service entities may be arranged into different categories, wherein user selection, navigation, and/or purchase patterns known to the service provider 180 may be utilized to determine the user's mood at different periods of time.

In one aspect, the service provider 180 may monitor and track webpages visited, webpages viewed, content or webpages visited and/or viewed, content of searches conducted by the user, frequency of searches, movements, and/or behavior conducted by the user. In another aspect, the mood of the user may be determined based on the identity persona of the user and/or personality type of the user. In another aspect, the mood of the user in real time may be adjusted based on navigation behavior during a certain period of time to provide deviations and/or variations in marketing to the user. In another aspect, mood may be determined based on the type of music the user is listening to and/or interested within a particular interval of time. The mood of the user may be determined in any number of suitable ways, in any number of suitable algorithms. For example, if a user has been reading about a disaster, such as an earthquake, hurricane, etc., the user may be in a mood for giving or more prone to charity. If a user has just purchased one or more high-priced items or made a purchase totaling a high dollar amount, the user may be in a mood to do more shopping. In another example, if the use is searching for and/or purchasing religious items, the user's mood may be more spiritual and more prone to purchasing spiritual items or donating to religious organizations. If a user is searching for deals and/or using coupons, the user may be in the mood to find good deals and less apt to spend money on full price or costly items.

Referring to FIG. 2, the service provider 180 is adapted to market to the user based, at least, on current user navigation behavior and/or mood of the user (block 246). In one aspect, navigation behavior models, marketing messages, identity systems, etc. may be oriented to match the mood of the user in real time. In another aspect, selection history, navigation history, purchase history along with navigational behavior may be utilized by the service provider 180 to model mood and/or identity of the user to provide a seamless experience during online navigation. In another aspect, the service provider 180 may suggest websites to the user to visit or make offers to the user depending on the determined mood of the user. In another aspect, the service provider 180 is adapted to utilize what is known about the user coupled with selection, navigation, and/or purchase events to determine or adjust marketing messages provided to the user to promote and solicit to the user. For example, if the user is in a charitable, giving, or generous mood, the user may be provided with offers to donate to various charities. If the user is in a high-dollar spending mood, the user may be provided offers to purchase high-end items related to current or past purchases. If the user is in a sad mood, the user may be provided offers to make the user happy or smile, such as what the user has enjoyed purchasing before, pictures, songs, etc.

In one implementation, marketing involves a process by which business entities (e.g., merchants 140) utilize to generate interest in particular items, products, goods and/or services offered by the business entities. Marketing schemes may be developed to generate a business strategy that emphasizes market research, sales techniques, business communication, and/or business development. Marketing may incorporate various integrated processes that assist business entities with building strong customer relationships. Marketing may involve any type of business activity adapted to create, communicate, present, deliver, and exchange offerings that have a perceived value for customers. For example, offerings may include advertisements, coupons, commercials, etc. that relay marketing information to targeted customers to thereby entice the targeted customers to purchase particular items, products, goods and/or services from a particular business entity. In electronic commerce, offerings may include electronic advertisements, coupons, and commercials including audio and video (AV) offerings delivered over a network, such as the Internet.

In another implementation, marketing may be utilized to identify customers, satisfy customers, and retain customers. Marketing may involve management of business activities to identity particular customers as a primary focus. Marketing may involve strategies that assist business entities with shifting production focus to the mood of customers as a means of staying profitable. Marketing techniques may be adapted to research and develop strategies to anticipate and meet the psychological, emotional, and/or physical needs of customers.

In another implementation, marketing involves achieving business development goals depending on knowing the needs and wants of target customers and delivering satisfaction to the targeted customers. Marketing is adapted to anticipate the needs and wants of customers with a focused goal of satisfying these needs and wants more effectively than competitors.

The service provider 180 is adapted to store user information (block 250). In one aspect, user information may include attributes related to the user including user name, user account number, user location, payment media information, etc., which may be stored as part of the user account in the account database 190. In another aspect, user information may include data and information related to monitoring user selection events, monitoring user navigation events, and/or monitoring user purchase events, which may be stored as part of the user account in the account database 190. In another aspect, user information may include data and information related to user navigation behavior and/or mood of the user as determined by the service provider 180, which may be stored as part of the user account in the account database 190. In still another aspect, user information may include data and information related to user marketing based on user navigation behavior and/or mood of the user, which may be stored as part of the user account in the account database 190.

In one implementation, the service provider 180 may utilize one or more other databases (e.g., internal and/or external databases 196) for storing data and information related to user information. Databases utilized by the service provider 180 may provide a historical survey of user information and financial transactions between the user device 120, the one or more merchant devices 140, and the service provider 180. The service provider 180 may be adapted to monitor, track, log, and store user information related to network based information exchanges between the user device 120, each merchant 140, and/or the service provider 180. The stored user information is accessible from the databases 196 for assessment, analysis, maintenance, and settlement.

In another implementation, any data and information related to monitoring user selection events, monitoring user navigation events, monitoring user purchase events, user navigation behavior, mood of the user, and/or user marketing may be displayed via a display device to a user of the user device 120 and/or an administrator of the service provider 180 without departing from the scope of the present disclosure.

Figure 3:
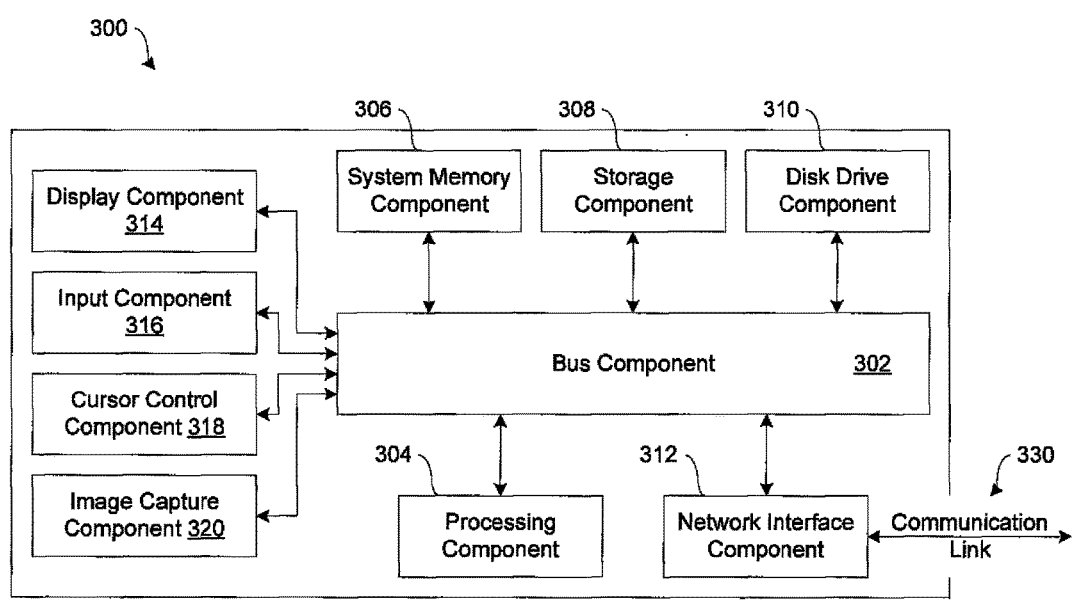
FIG. 3 shows a block diagram of a computer system suitable for implementing one or more embodiments of the present disclosure.

FIG. 3 is a block diagram of a computer system 300 suitable for implementing various embodiments of the present disclosure, including the user device 120, the merchant devices 140, and the service provider device 180. In various implementations, the user device 120 may comprise a network communication device (e.g., mobile cellular phone, laptop, personal computer, etc.) capable of communicating with the network 160, the merchant devices 140 may comprise a network computing device (e.g., a network server), and the service provider device 180 may comprise a network computing device (e.g., a network server). In other implementations, it should be appreciated that the merchant devices 140 and the service provider device 180 may comprise a network communication device (e.g., mobile cellular phone, laptop, personal computer, etc.) capable of communicating with the network 160, without departing from the scope of the present disclosure. Hence, it should be appreciated that each of the devices 120, 140, 180 may be implemented as the computer system 300 for communication with the network 160 in a manner as follows.

In accordance with various embodiments of the present disclosure, computer system 300, such as a mobile communication device and/or a network server, includes a bus 302 or other communication mechanism for communicating information, which interconnects subsystems and components, such as processing component 304 (e.g., processor, micro-controller, digital signal processor (DSP), etc.), system memory component 306 (e.g., RAM), static storage component 308 (e.g., ROM), disk drive component 310 (e.g., magnetic or optical), network interface component 312 (e.g., modem or Ethernet card), display component 314 (e.g., CRT or LCD), input component 316 (e.g., keyboard), cursor control component 318 (e.g., mouse or trackball), and image capture component 320 (e.g., analog or digital camera). In one implementation, disk drive component 310 may comprise a database having one or more disk drive components.

In accordance with embodiments of the present disclosure, computer system 300 performs specific operations by processor 304 executing one or more sequences of one or more instructions contained in system memory component 306. Such instructions may be read into system memory component 306 from another computer readable medium, such as static storage component 308 or disk drive component 310. In other embodiments, hard-wired circuitry may be used in place of or in combination with software instructions to implement the present disclosure.

Logic may be encoded in a computer readable medium, which may refer to any medium that participates in providing instructions to processor 304 for execution. Such a medium may take many forms, including but not limited to, non-volatile media and volatile media. In various implementations, non-volatile media includes optical or magnetic disks, such as disk drive component 310, and volatile media includes dynamic memory, such as system memory component 306. In one aspect, data and information related to execution instructions may be transmitted to computer system 300 via a transmission media, such as in the form of acoustic or light waves, including those generated during radio wave and infrared data communications. In various implementations, transmission media may include coaxial cables, copper wire, and fiber optics, including wires that comprise bus 302

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computer system 300. In various other embodiments of the present disclosure, a plurality of computer systems 300 coupled by communication link 330 (e.g., network 160 of FIG. 1, such as a LAN, WLAN, PTSN, and/or various other wired or wireless networks, including telecommunications, mobile, and cellular phone networks) may perform instruction sequences to practice the present disclosure in coordination with one another.

Computer system 300 may transmit and receive messages, data, information and instructions, including one or more programs (i.e., application code) through communication link 330 and communication interface 312. Received program code may be executed by processor 304 as received and/or stored in disk drive component 310 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

It should be appreciated that like reference numerals are used to identify like elements illustrated in one or more of the figures, wherein showings therein are for purposes of illustrating embodiments of the present disclosure and not for purposes of limiting the same.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method comprising:
   receiving, by a service provider server and over a network, information associated with browsing navigation events and browsing selection events made by a user on a user device reported by a browsing module of a user interface application, the browsing navigation events and the browsing selection events including browsing navigation events and browsing selection events associated with social network sites and merchant sites;
   receiving, by the service provider server, information associated with purchase events made by the user on the user device;
   determining, at the service provider server and using a pattern identifying module, one or more user browser patterns based on the browsing navigation events and the browsing selection events;
   determining, by the pattern identifying module, one or more purchase patterns based on the purchase events;
   determining, at the service provider server and using the pattern identifying module, one or more likelihoods of the user to be interested in one or more categories of goods or services based on the determined one or more user browser patterns and the determined one or more purchase patterns; and
   providing, by the service provider server, content to the user on the user device based on the determined one or more likelihoods.

2. The method of claim 1, wherein the provided content comprises recommended goods or services from the one or more categories.

3. The method of claim 1, wherein the provided content includes one or more offers for goods or services from the one or more categories.

4. The method of claim 1, wherein the provided content includes one or more recommended websites.

5. The method of claim 1, wherein receiving the information associated with the browsing navigation events and the browsing selection events comprises a server interface module on the service provider server communicating with a user interface module on the user device.

6. The method of claim 1, wherein each of the one or more likelihoods of the user to be interested in one or more categories of goods or services are selected from a group consisting of charitable giving, self-improvement, mobile gaming, spiritual interest, high spending, and low spending.

7. The method of claim 1, wherein the browsing navigation events and the browsing selection events further include browsing navigation and browsing selection events associated with information resource sites.

8. The method of claim 7, further comprising determining, at the service provider server and using the pattern identifying module, an identity of the user based on the browser patterns.

9. The method of claim 7, wherein the browsing navigation events and the browsing selection events are associated with both merchant and non-merchant websites.

10. A system comprising:
    a non-transitory memory; and
    one or more hardware processors coupled to the non-transitory memory and configured to read instructions from the non-transitory memory to cause the system to perform operations comprising:
    receiving, via a service interface application of a service provider server, information associated with browsing navigation events and browsing selection events made by a user on a user device reported by a browsing module of a user interface application, the browsing navigation events and the browsing selection events including browsing navigation events and browsing selection events associated with social network sites and merchant sites;

accessing information associated with purchase events made by the user on the user device;

determining, by a pattern identifying module of the service interface application, one or more user browser patterns based on the browsing navigation events and the browsing selection events;

determining, by the pattern identifying module, one or more purchase patterns based on the purchase events;

determining, by the pattern identifying module, one or more likelihoods of the user to be interested in one or more categories of goods or services based on the one or more user browser patterns and the one or more purchase patterns; and providing, by the service interface application, content to the user on the user device based on the determined one or more likelihoods.

11. The system of claim 10, wherein the provided content includes one or more offers for goods or services from the one or more categories.

12. The system of claim 10, wherein the provided content includes one or more recommended websites.

13. The system of claim 10, wherein the browsing navigation events and the browsing selection events further include browsing navigation events and browsing selection events associated with information resource sites.

14. The system of claim 10, wherein the operations further comprise determining, by the pattern identifying module, an identity of the user based on the one or more user browser patterns and the one or more purchase patterns.

15. The system of claim 10, wherein the operations further comprise determining, using the pattern identifying module, an identity of the user based on the browser patterns.

16. A non-transitory machine-readable medium having stored thereon machine-readable instructions executable to cause a machine to perform operations comprising:

accessing information associated with browsing navigation events and browsing selection events made by a user on a user device reported by a browsing module of a user interface application, the browsing navigation events and the browsing selection events including browsing navigation and browsing selection events associated with social network sites and merchant sites;

accessing information associated with purchase events made by the user on the user device;

determining, by a pattern identifying module, one or more user browser patterns based on the browsing navigation events and the browsing selection events;

determining, by the pattern identifying module, one or more purchase patterns based on the purchase events;

determining, by the pattern identifying module, one or more likelihoods of the user to be interested in one or more categories of goods or services based on the one or more user browser patterns and the one or more purchase patterns; and provide content to the user on the user device based on the determined one or more likelihoods;

wherein the machine is associated with a service provider server.

17. The non-transitory machine-readable medium of claim 16, wherein the provided content includes one or more offers for goods or services from the one or more categories.

18. The non-transitory machine-readable medium of claim 16, wherein the provided content includes one or more recommended websites.

19. The non-transitory machine-readable medium of claim 16, wherein the browsing navigation events and the browsing selection events further include browsing navigation events and browsing selection events associated with information resource sites.

20. The non-transitory machine-readable medium of claim 16, wherein the operations further comprise determining, by the pattern identifying module, an identity of the user based on the one or more user browser patterns and the one or more purchase patterns.

* * * * *